United States Patent
Sayko et al.

(10) Patent No.: US 9,304,994 B2
(45) Date of Patent: Apr. 5, 2016

(54) MEDIA MANAGEMENT BASED ON DERIVED QUANTITATIVE DATA OF QUALITY

(75) Inventors: Robert Sayko, Colts Neck, NJ (US); Sean Carolan, Freehold, NJ (US)

(73) Assignee: AT&T Intellectual Property II, L.P., Atlanta, GA (US)

( * ) Notice: Subject to any disclaimer, the term of this patent is extended or adjusted under 35 U.S.C. 154(b) by 1398 days.

(21) Appl. No.: 11/847,800

(22) Filed: Aug. 30, 2007

(65) Prior Publication Data
US 2009/0063561 A1     Mar. 5, 2009

(51) Int. Cl.
*G06F 7/00*        (2006.01)
*G06F 17/30*       (2006.01)

(52) U.S. Cl.
CPC ...... *G06F 17/3005* (2013.01); *G06F 17/30038* (2013.01); *G06F 17/30864* (2013.01)

(58) Field of Classification Search
CPC .............. G06F 17/30038; G06F 17/30876; G06F 17/30035; G06F 17/30047; G06F 17/30648
See application file for complete search history.

(56) References Cited

U.S. PATENT DOCUMENTS

| | | | |
|---|---|---|---|
| 5,216,503 A | 6/1993 | Paik et al. | |
| 5,249,053 A | 9/1993 | Jain | |
| 5,867,166 A | 2/1999 | Myhrvold et al. | |
| 5,966,465 A | 10/1999 | Keith et al. | |
| 5,990,955 A | 11/1999 | Koz | |
| 6,125,201 A | 9/2000 | Zador | |
| 6,493,023 B1 | 12/2002 | Watson | |
| 6,970,859 B1 | 11/2005 | Brechner et al. | |
| 7,038,710 B2* | 5/2006 | Caviedes | 348/180 |
| 7,281,034 B1* | 10/2007 | Eyal | 709/219 |
| 7,620,716 B2* | 11/2009 | Pirzada et al. | 709/224 |
| 7,683,931 B2* | 3/2010 | Pirzada et al. | 348/192 |
| 8,185,543 B1* | 5/2012 | Choudhry et al. | 707/767 |
| 2003/0185301 A1* | 10/2003 | Abrams et al. | 375/240.12 |
| 2006/0020624 A1* | 1/2006 | Svendsen et al. | 707/103 R |
| 2007/0209025 A1* | 9/2007 | Jing et al. | 707/3 |
| 2007/0217761 A1* | 9/2007 | Chen et al. | 386/86 |
| 2007/0233701 A1* | 10/2007 | Sherwood et al. | 707/10 |
| 2009/0323803 A1* | 12/2009 | Gomila et al. | 375/240.02 |

\* cited by examiner

*Primary Examiner* — Jau-Shya Meng

(57) ABSTRACT

Systems, methods, and computer readable media for media management provide a derived quantitative data of quality for video media files. The method embodiment comprises receiving a request for a video media file, identifying one or more video media files associated with the request, measuring at least one audio or visual quality associated with each video media file by analyzing at least one of: compression artifacts or grading for the each video media file, generating quantitative data based on the measured at least one audio or visual quality for the each video media file, and returning the quantitative data associated with the each video media file. Other features include the ability to compare, archive, filter, sort and select video media files based on the quantitative data.

19 Claims, 3 Drawing Sheets

FIG. 3

Search Results for "john mayer daughters"

Sort by: Releveance | Date Added | View Count | User Rating | Quality Rating

| | | | |
|---|---|---|---|
|  | Daughters – John Mayer<br>in it is Gemma Ward. And no, John Mayer does not have a daughter. Nor is he married... john mayer daughters<br>Time: 03:58 | ☆☆☆☆✫<br>From: superxian<br>Views: 267,517<br>Added: 7 months ago<br>More in Music | Quality Rating<br>8 \| 1/2 |
|  | John Mayer – Daughters<br><br>John Mayer Daughters (C) 2006 Aware Records LLC...John Mayer Daughters Pop Music Video<br>Time: 03:57 | ☆☆☆☆✫<br>From: johnmayer<br>Views: 4,336<br>Added: 4 months ago<br>More in Music | Quality Rating<br>6 \| 2/2 |
|  | John Mayer – Daughters (Live)<br>John Mayer on September 16 in Toronto at Yonge and Dundas Square....john mayer<br>Time: 04:39 | ☆☆☆☆✫<br>From: caryimostacho<br>Views: 7,707<br>Added: 10 months ago<br>More in Music | Quality Rating<br>5 \| 1/1 |
|  | John Mayer – Daughters – Irvine Amphitheater 9/27/06<br>John Mayer performing "daughters" 9/27/06....john mayer daughters invine<br>Time: 04:12 | ☆☆☆☆✫<br>From: youdestrovme<br>Views: 4,599<br>Added: 10 months ago<br>More in Music | Quality Rating<br>6 \| 1/3 |
|  | John Mayer – Daughters – Irvine<br>www.myspace.com jimmymancus. Please check out my original music...John Mayer Daughters Jimmy Mancus acoustic guitar<br>Time: 04:43 | ☆☆☆☆☆<br>From: jimmymancus<br>Views: 11,853<br>Added: 11 months ago<br>More in Music | Quality Rating<br>5 \| 2/3 |
|  | John Mayer – Daughters – Irvine<br>John Mayer performing Daughters with new band in Dundas Square at Toronto. foregive the shakyness... john mayer daughters live best buy Toronto dundas square perform<br>Time: 04:15 | ☆☆☆☆☆<br>From: pinaylife<br>Views: 3,995<br>Added: 9 months ago<br>More in Music | Quality Rating<br>3 \| 3/3 |

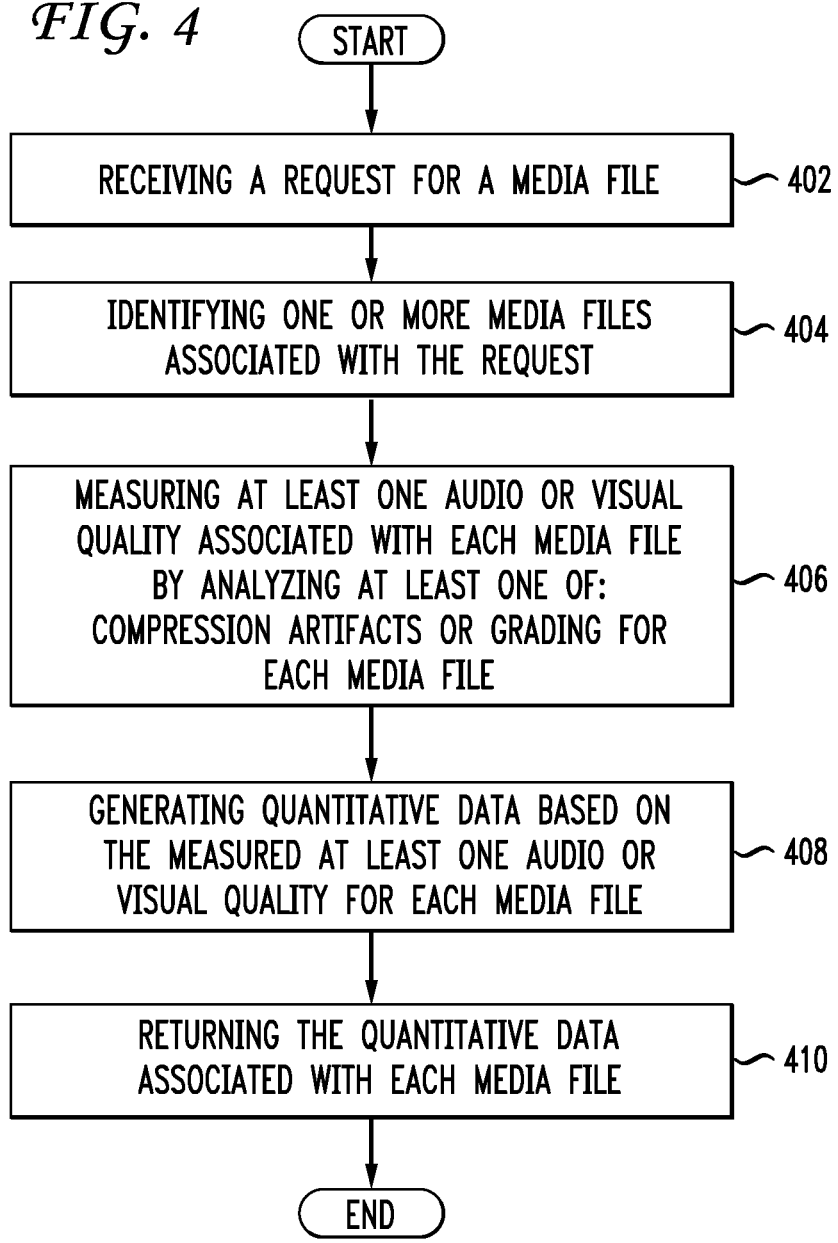

MEDIA MANAGEMENT BASED ON DERIVED QUANTITATIVE DATA OF QUALITY

BACKGROUND OF THE INVENTION

1. Field of the Invention

This invention generally pertains to qualitative analysis of data and more particularly to analyzing and using quality data to rank multiple copies of a media file.

2. Introduction

Digital cameras, portable media players, and web sites that allow visitors to stream media clips have contributed to a growing demand for media content. With so much media content available and easily accessible, the audio or visual quality of the media file can be an important factor in terms of sorting, filtering, and selection.

Media files may have the same file type, associated bit rates and/or other similar static attributes which all imply a certain level of quality. However, quality of such media can still be significantly different as it may be affected by numerous conditions that can create random "noise" or artifacts. This in turn affects how a user perceives the media when viewing/hearing it (e.g. bad video or audio), or can reduce/interfere with compression algorithms, impede delivery protocols or subsequent copy and reproduction of the media.

Furthermore, multiple copies of a media file may be available but in different formats which may further affect the media file or play back. There may be multiple reasons why media files may have differing qualities.

Accordingly, what is needed in the art is an improved way to provide derived quantitative data of quality for media files.

SUMMARY OF THE INVENTION

Additional features and advantages of the invention will be set forth in the description which follows, and in part will be obvious from the description, or may be learned by practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth herein.

Disclosed herein are systems, methods, and computer readable media for providing a ranking of media files. An exemplary method embodiment of the invention comprises receiving a request for a media file, identifying one or more media files associated with the request, measuring at least one audio or visual quality associated with each media file by analyzing at least one of: compression artifacts or grading for each media file, generating quantitative data based on the measured at least one audio or visual quality for each media file, and returning the quantitative data associated with each media file.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which:

FIG. 3 illustrates examples of sorting similar media files; and

FIG. 4 illustrates an example method embodiment of the invention.

DETAILED DESCRIPTION OF THE INVENTION

Various embodiments of the invention are discussed in detail below. While specific implementations are discussed, it should be understood that this is done for illustration purposes only. A person skilled in the relevant art will recognize that other components and configurations may be used without parting from the spirit and scope of the invention.

Figure 1:
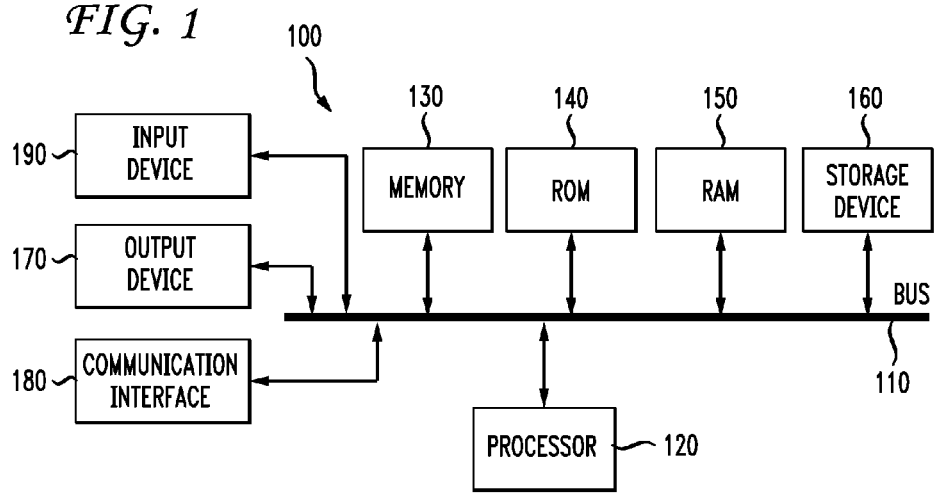
FIG. 1 illustrates a basic system or computing device embodiment of the invention.

With reference to FIG. 1, an exemplary system for implementing the invention includes a general-purpose computing device 100, including a processing unit (CPU) 120 and a system bus 110 that couples various system components including the system memory such as read only memory (ROM) 140 and random access memory (RAM) 150 to the processing unit 120. Other system memory 130 may be available for use as well. It can be appreciated that the invention may operate on a computing device with more than one CPU 120 or on a group or cluster of computing devices networked together to provide greater processing capability. The system bus 110 may be any of several types of bus structures including a memory bus or memory controller, a peripheral bus, and a local bus using any of a variety of bus architectures. A basic input/output (BIOS), containing the basic routine that helps to transfer information between elements within the computing device 100, such as during start-up, is typically stored in ROM 140. The computing device 100 further includes storage means such as a hard disk drive 160, a magnetic disk drive, an optical disk drive, tape drive or the like. The storage device 160 is connected to the system bus 110 by a drive interface. The drives and the associated computer readable media provide nonvolatile storage of computer readable instructions, data structures, program modules and other data for the computing device 100. The basic components are known to those of skill in the art and appropriate variations are contemplated depending on the type of device, such as whether the device is a small, handheld computing device, a desktop computer, or a computer server.

Although the exemplary environment described herein employs the hard disk, it should be appreciated by those skilled in the art that other types of computer readable media which can store data that are accessible by a computer, such as magnetic cassettes, flash memory cards, digital versatile disks, cartridges, random access memories (RAMs), read only memory (ROM), a cable or wireless signal containing a bit stream and the like, may also be used in the exemplary operating environment.

To enable user interaction with the computing device 100, an input device 190 represents any number of input mechanisms, such as a microphone for speech, a touch sensitive screen for gesture or graphical input, keyboard, mouse, motion input, speech and so forth. The input may be used by the presenter to indicate the beginning of a speech search query. The device output 170 can also be one or more of a number of output means. In some instances, multimodal systems enable a user to provide multiple types of input to communicate with the computing device 100. The communications interface 180 generally governs and manages the user input and system output. There is no restriction on the invention operating on any particular hardware arrangement and therefore the basic features here may easily be substituted for improved hardware or firmware arrangements as they are developed.

For clarity of explanation, the illustrative embodiment of the present invention is presented as comprising individual functional blocks (including functional blocks labeled as a "processor"). The functions these blocks represent may be provided through the use of either shared or dedicated hardware, including, but not limited to, hardware capable of executing software. For example the functions of one or more processors presented in FIG. 1 may be provided by a single shared processor or multiple processors. (Use of the term "processor" should not be construed to refer exclusively to hardware capable of executing software.) Illustrative embodiments may comprise microprocessor and/or digital signal processor (DSP) hardware, read-only memory (ROM) for storing software performing the operations discussed below, and random access memory (RAM) for storing results. Very large scale integration (VLSI) hardware embodiments, as well as custom VLSI circuitry in combination with a general purpose DSP circuit, may also be provided.

As used herein, the term "media file(s)" is intended to encompass all forms of digital media, including, but not limited to, graphic images, sounds, animations, photographs, and video. A media file may be stored in any format, or copies of the same or similar media file may be stored in multiple formats.

The present invention relates to media management based on derived quantitative quality of data. Quality data of media files is usually tagged via the file type and parameters such as an associated bit rate (e.g. MP3 with 192 bitrate). However, as suggested above, quality of such media can still be significantly different as it may be affected by numerous conditions that can create random "noise" or artifacts. The present invention can identify the quality of a media file, much like a human might analyze the quality of an audio or video file, and then use that quality in a beneficial manner to aid the user in differentiating between media files. Some encoding and transcoding applications can detect these qualitative issues and can include a measure of the quality into the meta-data for the media. Alternatively, there are now new content management tools that can actually "view" or "listen" to media to attain a "user perspective" on quality. Information like this can also be associated with the media. In the latter case, the media can be "examined" in real time each time the file is to be used or is transfered—thus unlike meta-data created at time of file encoding, quality can be evaluated as desired. All this allows a user of media/content to select, sort and use the best quality file from a group of similar media/titles.

A specific real world example embodiment applies to the YouTube.com experience. On YouTube, there are often multiple instances of the same video (e.g. multiple copies of the television segment of a Tiger Woods putt). While the files are all supposed to be of the same type, not all are of the same quality. This is perhaps due to the method used by the different submitters of the file to process/capture it, but there are of course other things that could also have affected quality. This invention therefore includes not only the method of compiling and using quality data about a file for sorting, but also the concept of adding this as a service/feature to a application like YouTube. Alternatively, this capability can be completely client based, but in the specific example of YouTube, it would be more effective as a server/network based application.

Similarly, YouTube itself could analyze files in this way to determine a quality rating and then associate that with a quantitative grade that would allow users to block/filter videos that they feel are not worth viewing.

Figure 2:
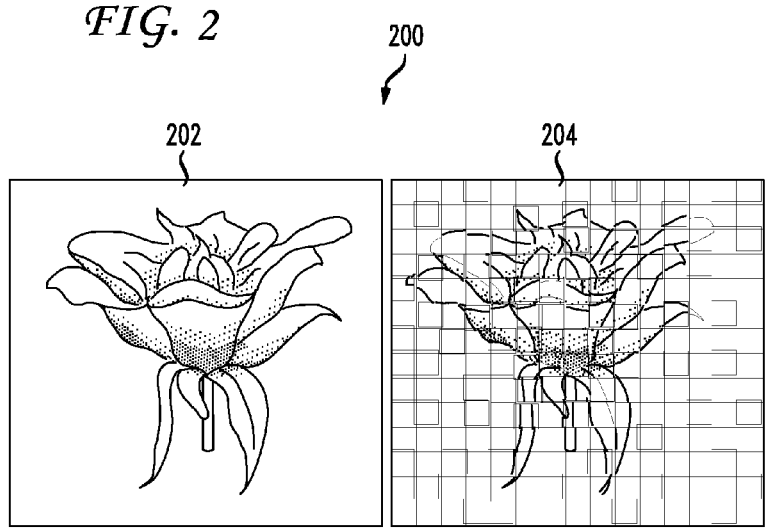
FIG. 2 illustrates an image developing artifacts after compressing.

In the YouTube example, deriving a quantitative quality of data can take into account compression artifacts, qualitative grading, or any combination of the two. During the encoding or processing, a media file may develop compression artifacts. FIG. 2 illustrates an example of an image developing artifacts during compression 200. The original image 202 is clear with a good color grade. However, after being converted to JPEG format, the image becomes fuzzy with a loss of edge clarity 204. The preferred embodiment can detect errors in the creation of the data which can come across as artifacts. Example artifacts include, but are not limited to noise, pixilation, saturation, resolution, inconsistencies in the file such as "blips," and any errors or losses during the compression, encoding, or processing of a media file. After detecting the artifacts, the preferred embodiment derives a quantitative representation of the quality of the media file, which may be included in metadata associated with the media file. The quantitative representation, however, should not be limited to a number. For example, the representation can be a matrix, vector, or other representation of a quality rating in any space consisting of one or more numbers, characters, symbols, or other tokens.

The preferred embodiment also takes into account a quality grading component. In the preferred embodiment the quality grading looks at a variety of factors and determines quality on a case to case basis. For visual media files, the grading may be based on comparative picture quality. The grading can look at how often pixels in a given decompressed output frame smear together with ones adjacent to them, or if the color depth and resolution is what it should be in the produced output. For example, most people don't realize that color video tape does not have nearly as much resolution in its color component as it does in its detailing black-and-white component. In the preferred embodiment, the system is aware of that, and factors this in to the grading determination, thus taking into account the quality of the source (as well as can be measured) as well as the quality of the current copy generation being analyzed. In many instances, multiple media files of the same event might exist. For example, there might be multiple videos of a music concert. One video was taken with a cell phone while another with a video camera from a different angle. In this example, factors the quality grading component may take into account include, but are not limited to, lighting, clarity, noise, pixilation, resolution, and color. In a recording of a person speaking, an example embodiment may determine how well it "understands" the person in order to measure the quality of the file. Once again, the grading of the media file is quantized and may be included in metadata associated with the media file.

The quality of the grading component and the artifacts can be measured not only during the compression, encoding, or processing of a file, but also in realtime. An example embodiment uses a real time tool to "parse" or preview a file to get an instantaneous quality rating. For example, a media file that has not received quantitative data of quality during compressing, encoding, or processing, can be streamed and given an instantaneous quality rating. As suggested above, defining the rating scale is a separate issue that can be done in a variety of ways.

The scope of the present invention also includes a service that can be offered to users of content. It can save time for users who may want the best version of a media file and/or users engaged in archiving. For example, a news company may want to only save the best version of a particular event they recorded. The news company can use the present invention to automatically determine and archive only the best version of a media file. This alleviates a person having to view all the versions of a given media file.

Likewise, the news agency can filter files that do not meet a certain threshold in quality. An example embodiment may archive files above a threshold quality rating and discard those below. Users of services, such as websites that stream media, can also filter files that do not meet a threshold or that are not the best version of a file. For instance, if two of the same music video exist on a website, and one of the videos is inferior in visual or audio quality than the other, the user can filter out the inferior video so his search only results in the best music video being returned.

Media files can also be sorted based on the derived quantitative data relating to the quality of the file. In many cases, a service has different recordings of the same event or different encodings of the same media clip. For example, FIG. 3 illustrates what the results of a YouTube search 300 for "john Mayer daughters" 302 may look like. The music video appears twice 304 along with various live recordings 306. YouTube allows the user to sort by relevance, date added, view count, or user rating 308. The present invention allows the option of sorting based on a quality rating 310. This rating may be included in the metadata or can be acquired in real-time. Both an objective 314 and relative 316 quality rating 312 may be presented to the user. In the example embodiment, the objective rating is based on a scale of ten. The first music video returned received an objective rating of "8" 314. However, the rating can be defined in numerous ways such as using a green symbol to indicate a good-quality file, a yellow for an average-quality file, and a red symbol for a bad-quality file. Defining the rating is not at issue, but rather the ability to measure the quality of the media file and manage media content based on the measure. The quality rating may depend on a case by case basis. For example, the user might wish to select the video with the best sound quality. The user could also select the video based on the best picture quality or any other relevant factor or combination of factors. Relative ratings are the quality of a media file compared to one or more other media files. The comparisons may be based on groupings determined as described below. In FIG. 3, the first John Mayer video is ranked as the best of the two in its group, as indicated by the "½" 316. Files may have the same objective rating yet still have different relative ratings.

The media files may be grouped in various ways when returned from a request for a media file. For example, a user looking for the best version of a song to download can search the availability of the song on various disparate databases. The song can be compared, grouped, and presented to the user; though not necessarily in that order. Media files may also be grouped according to their time. For instance, media files that are close in length (time), such as a one second difference, may be grouped together while media files that differ greatly in time. The name of the media file may also be used for grouping. In FIG. 3, out of the four concerts returned 306 by the search for "john mayer daughters" 302, three have the title "John Mayer—Daughters—Irvine" and are grouped and compared to each other 318. The user who posted the media file may also factor into grouping. Generally, a user would not post the same media file twice on the same site. Grouping may also be based on the content of a media file. To illustrate, the content of a media file may be compared with the content of another media file. If the content is deemed similar enough, then the media files may be grouped. Grouping may take into account one or more of the aforementioned factors.

Another aspect of this invention is the quality of media files can be compared. For example, various websites offer compressed music files to purchase for download. The quality of the music, from service to service, may differ based on the processing, compression, or encoding of the file. The present invention can do a quality comparison of these files. In one embodiment, the comparison may be used in order to obtain quantitative data relating to the quality of the media file. In another embodiment a comparison of quantitative data of quality may be acquired independently for each media file, and the quantitative data can be compared. The comparison may be between files of the same type (e.g. MP3 and MP3) or files of different types (e.g. MP3 and MP4).

FIG. 4 illustrates an exemplary method embodiment of the invention. The method comprises receiving a request for a media file 402. The request may be either user or machine (e.g. computing device) generated. The method also comprises identifying one or more media files associated with the request measuring at least one audio or visual quality 404. The method further comprises measuring at least one of audio and/or visual quality associated with each media file by analyzing at least one of: compression artifacts or grading for each media file 406. There may be different ratings for different audio or visual qualities for each media file. To illustrate, there may be separate ratings for both the bass and treble on an audio track. The method further comprises generating quantitative data based on the measured at least one audio or visual quality for each media file 408. The quantitative data comprises any data that is representative of a quality rating of at least one audio or visual quality. There may be different data for different qualities or a single rating for multiple qualities. The data can be included in metadata or be obtained instantaneously using a real-time parsing tool. As discussed above, the data can be used to sort, filter, compare, archive, or select media files. The method also comprises returning the quantitative data associated with each media file 410. The information may also be presented to a user. Such information may or may not aide the user in selecting a media file. For instance, multiple files of a musician performing a song may exist, albeit the performance takes place at different locations. The quality of the media files of the different performances can be presented for the user's information, although a show at a particular location might interest a viewer more even though the file quality may be worse. The information may also be returned to a computing device. For instance, the information may assist in automatic archival of media files.

In another aspect, the system may analyze multiple media files and discover that portions of one media file may be degraded or have artifacts while other portions are of relative high quality. With digital media files, an aspect of the invention may be to parse media files into separately rated segments and then concatenate the highest quality segments together. The end result in this scenario would be a media file that has a higher quality than any individual media file from which the best version was constructed.

The system may perform some automatic analysis of format and perform format conversion to insure that the final media file is of the best quality and of the appropriate format. A dialog with the user may aid in some decisions (i.e., "Would you prefer the media file in format X or Y?"). Thus, using the quality analysis approach, in this aspect of the invention, the user can data in a media file of the highest quality possible.

Embodiments within the scope of the present invention may also include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures. When information is transferred or provided over a network or another communications connection (either hardwired, wireless, or combination thereof to a computer, the computer properly views the connection as a computer-readable medium. Thus, any such connection is properly termed a computer-readable medium. Combinations of the above should also be included within the scope of the computer-readable media.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, objects, components, and data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Those of skill in the art will appreciate that other embodiments of the invention may be practiced in network computing environments with many types of computer system configurations, including personal computers, hand-held devices, multi-processor systems, microprocessor-based or programmable consumer electronics, network PCs, mini-computers, mainframe computers, and the like. Embodiments may also be practiced in distributed computing environments where tasks are performed by local and remote processing devices that are linked (either by hardwired links, wireless links, or by a combination thereof through a communications network. In a distributed computing environment, program modules may be located in both local and remote memory storage devices.

Although the above description may contain specific details, they should not be construed as limiting the claims in any way. Other configurations of the described embodiments of the invention are part of the scope of this invention. For example, the present invention could be configured according to the type of media file being evaluated or according to the device on which it is implemented. To illustrate, a photographer could rapidly snap multiple photographs of the same scene with the camera having an automatic filter keeping only the best quality photograph. Accordingly, the appended claims and their legal equivalents should only define the invention, rather than any specific examples given.

We claim:

1. A method comprising:
receiving a request for a compressed video media file;
identifying, via a processor, a set of compressed video media files associated with the request, where each compressed video media file in the set of compressed video media files is an instance of a same video, and wherein each compressed video media file is stored in a disparate database from other compressed video media files in the set of compressed video media files;
identifying segments within each compressed video media file within the set of compressed video media files, to yield segments of each video media file in the set of video media files;
rating a signal quality for the segments of each compressed video media file in the set of video media files by measuring a number of compression artifacts found in each compressed video media file, the compression artifacts existing based on compressing each compressed video media file using a respective compression algorithm, to yield signal quality rated segments of each compressed video media file;
generating, in real-time, quantitative data based on the signal quality of each compressed video media file;
combining the segments of the each compressed video media file having highest respective rankings per the signal quality rated segments of each compressed video media file, to generate a composite version of the same video; and
returning the quantitative data associated with each compressed video media file and of the composite version.

2. The method of claim 1, further comprising including the quantitative data in metadata associated with each compressed video media file.

3. The method of claim 1, wherein determining the signal quality occurs while parsing each compressed video media file in real-time.

4. The method of claim 1, wherein determining the signal quality is based on a comparison between each compressed video media file and another compressed video media file in the set of compressed video media files.

5. The method of claim 4, further comprising categorizing each compressed video media file according to one of: an availability of each compressed video media file and another compressed video media file from the set of compressed video media files in disparate databases, a time associated with each compressed video media file, a content of each compressed video media file, and a user that posted each compressed video media file.

6. The method of claim 5, further comprising sorting each compressed video media file based on the quantitative data of each compressed video media file.

7. The method of claim 6, further comprising presenting a user with each compressed video media file and the quantitative data.

8. The method of claim 7, further comprising receiving a selection of each compressed video media file from the user.

9. The method of claim 1, further comprising comparing each compressed video media file with a disparate video media file based on the quantitative data.

10. The method of claim 1, further comprising archiving each compressed video media file based on the quantitative data.

11. The method of claim 1, further comprising filtering each compressed video media file based on the quantitative data.

12. A system comprising:
a processor; and
a computer-readable storage medium storing instructions which, executed on the processor, perform operations comprising:
receiving a request for a compressed video media file;
identifying a set of compressed video media files associated with the request, where each compressed video media file in the set of compressed video media files is an instance of a same video, and wherein each compressed video media file is stored in a disparate database from other compressed video media files in the set of compressed video media files;

identifying segments within each compressed video media file within the set of compressed video media files, to yield segments of each video media file in the set of video media files;

rating a signal quality for segments of each compressed video media file in the set of video media files by measuring a number of compression artifacts found in each compressed video media file, the compression artifacts existing based on compressing each compressed video media file using a respective compression algorithm, to yield signal quality rated segments of each compressed video media file;

generating, in real-time, quantitative data based on the signal quality of each compressed video media file;

combining the segments of the each compressed video media file having highest respective rankings per the signal quality rated portions segments of each compressed video media file, to generate a composite version of the same video; and returning the quantitative data associated with each compressed video media file and of the composite version.

13. The system of claim 12, the computer-readable storage medium having additional instructions stored which, when executed by the processor, result in operations comprising including the quantitative data in metadata associated with each compressed video media file.

14. The system of claim 12, wherein determining the signal quality is based on a comparison between each compressed video media file and another compressed video media file in the set of compressed video media files.

15. The system of claim 12, the computer-readable storage medium having additional instructions stored which, when executed by the processor, result in operations comprising comparing each compressed video media file with the one other disparate video media file based on the quantitative data.

16. The system of claim 12, the computer-readable storage medium having additional instructions stored which, executed by the processor, result in operations comprising sorting each compressed video media file based on the quantitative data associated with each compressed video media file.

17. The system of claim 12, the computer-readable storage medium having additional instructions stored which, executed by the processor, result in operations comprising archiving each compressed video media file based on the quantitative data.

18. The system of claim 12, the computer-readable storage medium having additional instructions stored which, executed by the processor, result in operations comprising filtering each compressed video media file based on the quantitative data.

19. A non-transitory computer-readable storage device having instructions stored which, executed by a computing device, cause the computing device to perform operations comprising:

receiving a request for a compressed video media file;

identifying a set of compressed video media files associated with the request, where each compressed video media file in the set of compressed video media files is an instance of a same video, and wherein each compressed video media file is stored in a disparate database from other compressed video media files in the set of compressed video media files;

identifying segments within each compressed video media file within the set of compressed video media files, to yield segments of each video media file in the set of video media files;

rating a signal quality for segments of each compressed video media file in the set of video media files by measuring a number of compression artifacts found in each compressed video media file, the compression artifacts existing based on compressing each compressed video media file using a respective compression algorithm, to yield signal quality rated segments of each compressed video media file;

generating, in real-time, quantitative data based on the signal quality of each compressed video media file;

combining the segments of the each compressed video media file having highest respective rankings per the signal quality rated segments of each compressed video media file, to generate a composite version of the same video; and returning the quantitative data associated with each compressed video media file and of the composite version.

* * * * *